No. 770,273. Patented September 20, 1904.

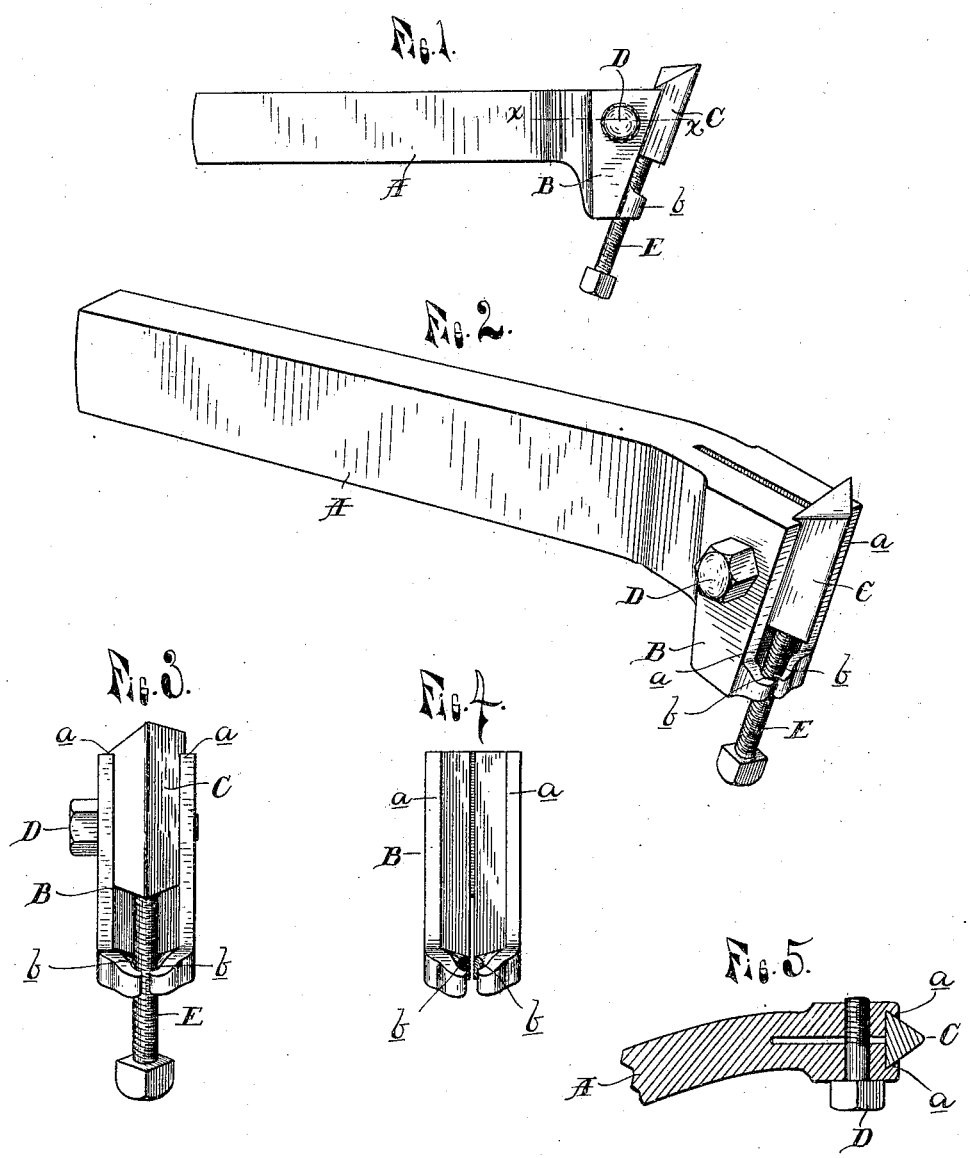

UNITED STATES PATENT OFFICE.

HENRY DYER, OF DETROIT, MICHIGAN.

CUTTING-TOOL.

SPECIFICATION forming part of Letters Patent No. 770,273, dated September 20, 1904.

Application filed November 22, 1901. Renewed February 18, 1904. Serial No. 194,299. (No model.)

*To all whom it may concern:*

Be it known that I, HENRY DYER, a citizen of the United States of America, residing at Detroit, in the county of Wayne and State of Michigan, have invented certain new and useful Improvements in Cutting-Tools, of which the following is a specification, reference being had therein to the accompanying drawings.

My invention relates to cutting-tools for use on lathe and other metal-working machines; and the invention consists in the peculiar construction and arrangement of a tool-holder of the split-head variety, whereby the split portions or jaws of the holder perform the double function of clamping the tool, as well as an adjusting-screw, against which the tool abuts, all as more fully hereinafter described, and shown in the accompanying drawings, in which—

Figure 1 is a side elevation showing my invention as applied to a lathe cutting-tool with a cutter of triangular cross-section. Fig. 2 is a perspective view of the tool in Fig. 1. Fig. 3 is a face elevation of the tool. Fig. 4 is a similar face elevation of the tool-holder without the screws. Fig. 5 is a horizontal section on line $x\ x$ in Fig. 1.

Referring to the drawings, A designates the shank of the tool-holder, and B the head, which is arranged at an angle or offset thereto, as with tools heretofore used. The face of the head is formed at an angle and is provided with dovetail guides $a$, between which the triangular cutter C is adjustably clamped in position. To this end the head is split in halves in a vertical plane at right angles to the face, whereby the halves form clamping-jaws adapted to clamp the cutter firmly by means of a clamping-screw D passing through both of the jaws. Each jaw extends below the upper or major portion between which the cutter is clamped, and these extensions form a minor jaw for clamping an adjusting-screw E, which abuts against the end of the cutter and is held in screw-threaded bearings $b\ b$, half formed on one jaw and half on the other.

In practice the parts being constructed and arranged as shown and described the clamping-screw D when tightened performs the double function of clamping both the cutter and the adjusting-screw, so that no jar or vibration can disturb the adjustment, while on the other hand when the clamping-screw is loosened the adjusting-screw can be turned by hand, and the adjustment of the cutter can thus be made much quicker and more accurate than where the use of a wrench is required and where extra provision has to be made for room to handle the wrench unless the whole tool is removed for adjustment.

It will be seen that on account of the greater proximity of the clamping-screw to the cutter than to the bearings of the adjusting-screw there is a preponderance of clamping force in favor of the cutter, and this preponderance I express by calling the parts of the head which carry the cutter and the adjusting-screw, respectively, the "major" and "minor" portions.

What I claim as my invention is—

In a cutting-tool, a tool-holder composed of a shank, a head vertically split in halves forming clamping-jaws, each clamping-jaw composed of like major and minor portions, the major portions being formed at the end of the shank, and dovetailed upon the face to clamp the cutter adjustably in position upon said major portions, and the minor portions forming extensions of the major portions, a clamping-screw passing through the major portions of the jaws and a set-screw carried by the minor portions of the jaws, said minor portions formed with screw-threaded half-bearings through which said set-screw passes in alinement with the cutter, and adapted to bear against the tail end of the cutter.

In testimony whereof I affix my signature in presence of two witnesses.

HENRY DYER.

Witnesses:
LEWIS E. HANDERS,
JOSEPH A. NOELKE.